(12) United States Patent
Ala-Luukko et al.

(10) Patent No.: US 6,850,762 B1
(45) Date of Patent: Feb. 1, 2005

(54) PROCEDURE AND SYSTEM FOR SETTING UP A TELECOMMUNICATION CONNECTION

(75) Inventors: Sami Ala-Luukko, Helsinki (FI); Tero Huostila, Helsinki (FI)

(73) Assignee: Sonera Oyj, Helsinki (FI)

( * ) Notice: Subject to any disclaimer, the term of this patent is extended or adjusted under 35 U.S.C. 154(b) by 547 days.

(21) Appl. No.: 09/599,385

(22) Filed: Jun. 22, 2000

(30) Foreign Application Priority Data

Dec. 31, 1997 (FI) .................................................. 974651
Dec. 18, 1998 (FI) .................................. PCT/FI98/00999

(51) Int. Cl.⁷ ................................................ H04Q 7/20
(52) U.S. Cl. .................... 455/445; 455/432.1; 455/405; 455/433
(58) Field of Search ............................ 455/433, 435.1, 455/436, 414.1, 456.1, 458, 425, 432.1, 445, 440, 512, 554.2, 405, 406, 407, 408, 414.2, 432.3, 415; 379/114, 115, 221

(56) References Cited

U.S. PATENT DOCUMENTS

| | | | | |
|---|---|---|---|---|
| 5,402,471 A | * | 3/1995 | Van Nielen | 455/436 |
| 5,570,417 A | * | 10/1996 | Byers | 379/114.02 |
| 5,799,072 A | * | 8/1998 | Vulcan et al. | 379/114.02 |
| 5,862,203 A | * | 1/1999 | Wulkan et al. | 379/114.02 |
| 6,067,452 A | * | 5/2000 | Alexander et al. | 455/428 |
| 6,081,712 A | * | 6/2000 | Buettner et al. | 455/433 |
| 6,151,492 A | * | 11/2000 | Melin | 455/414 |
| 6,169,791 B1 | * | 1/2001 | Pokress | 379/114.02 |
| 6,178,168 B1 | * | 1/2001 | Andersson | 370/360 |
| 6,195,553 B1 | * | 2/2001 | Claffery et al. | 455/445 |
| 6,198,923 B1 | * | 3/2001 | Buettner | 455/433 |
| 6,240,169 B1 | * | 5/2001 | Haskins | 379/114 |
| 6,269,156 B1 | * | 7/2001 | Matt et al. | 379/114.01 |
| 6,295,292 B1 | * | 9/2001 | Voit et al. | 370/352 |
| 6,295,350 B1 | * | 9/2001 | Schreyer | 379/221 |
| 6,343,073 B1 | * | 1/2002 | Mashinsky | 370/352 |
| 6,542,588 B1 | * | 4/2003 | Mashinsky | 379/114.02 |

\* cited by examiner

*Primary Examiner*—Nay Maung
*Assistant Examiner*—John J Lee
(74) *Attorney, Agent, or Firm*—Cohen, Pontani, Lieberman & Pavane

(57) ABSTRACT

In the inventive system, a telecommunication network includes a calling subscriber's terminal equipment, a called subscriber's terminal equipment, a home location register of the calling subscriber's subscription, a home location register of the called subscriber's subscription, a calling subscriber's visited mobile switching center, a communication server for route optimization of the connection to be set up, and a mobile switching center under which the called subscriber is located. A telecommunication connection is set up from the visited mobile switching center to the mobile switching center on the basis of call pricing data and/or network configuration data. The call pricing data and/or network configuration data for a variety of different possible routes are identified or determined by means of the communication server and used to identify the optimum route for the telecommunication connection.

5 Claims, 4 Drawing Sheets

PROCEDURE AND SYSTEM FOR SETTING UP A TELECOMMUNICATION CONNECTION

BACKGROUND OF THE INVENTION

1. Field of the Invention

The present invention relates to telecommunication technology. More particularly, through use of the procedure and system of the invention a telecommunication connection is set up in a mobile communication network by predeterminately routing the connection on the basis of call pricing data or network configuration data.

2. Description of Related Art

The use of a GSM (Global System for Mobile communications) telephone or handset or terminal device in another or foreign operator's network is commonly called roaming. With the rise of GSM as a world standard, international roaming traffic is becoming an important subject of interest and concern to mobile communication network operators.

Teleoperators typically have a multiplicity of available roaming partners in different countries. This is the case because GSM operators have signed an agreement, known as a Memorandum of Understanding (MoU), which provides that all member operators must establish roaming agreements with other operators. In any event, even in the absence of such roaming agreements among all operators, there will still be intensive growth in roaming traffic, placing significant strain on the resources of both the international network and those parties handling the billing tasks. In addition, the amount of data to be processed and the risks of abuse are likewise increasing, creating pressures to provide more effective routing and billing systems.

Teleoperators receive information on call charges for international calls from other teleoperators under the roaming agreement, in accordance with which teleoperators must inform other teleoperators in the event of changes in the pricing of calls subject to the roaming agreement. In this manner up to date call pricing data for the calling subscriber's home operator may be maintained.

Prior art routing call routing solutions applied in telecommunication and telephone networks are based on technical factors, such as physical route length or network load. There are currently two different methods used for the routing of GSM calls; one is so-called standard routing, and the other is optimal routing as defined in the GSM specifications.

The SOR (Support of Optimal Routing) method used in the GSM system is a property of a mobile communication network that enables calls to be routed directly to the actual location of a mobile station, or to a number indicated by a call transfer setting, without routing it via the subscriber's home Public Land Mobile Network (PLMN). An IPLMN (Interrogating PLMN) handles the call and determines possible optimization of each call in accordance with the information provided by the subscriber's home PLMN. When optimal routing is possible for subscribers in the network, the home PLMN either enables or disables optimal routing for the connection to be set up.

One drawback of the SOR method is that it only takes into account situations in which the calling and called subscribers are currently (i.e. at the time of call setup) located in the same country, or where the called subscriber is currently located in his or her home network. Moreover, the first stage of the SOR method only allows calls from one mobile station to another and call transfers or forwards from a mobile station to a wired-network telephone number. It does not however, and by way of example, allow calls from a mobile station to a subscriber in a wired telephone network. As a consequence, it has been estimated that the SOR method can be utilized to set up only a few percent of all calls. A particular problem with such prior art methods is that they do not take into account the costs incurred by the operator when calls are set up and routed via, and in the areas of, mobile switching centers of other (i.e. foreign) teleoperators.

OBJECTS AND SUMMARY OF THE INVENTION

It is accordingly the desideratum of the present invention to eliminate, or at least significantly reduce, the drawbacks and deficiencies of prior art methods and arrangements as for example hereinabove described.

It is a specific object of the invention to provide a new type of procedure and system which takes account, in determining appropriate or optimized routing of calls, of the costs incurred by a teleoperator when the calls are set up and routed via and in the areas of mobile switching centers of other or foreign teleoperators.

It is a further object of the invention to provide such a procedure and system in which a communication server determines an optimal route from the calling subscriber to the called subscriber using the call pricing data specified in roaming agreements and stored in a database.

The system of the present invention comprises a calling subscriber's terminal equipment, a called subscriber's terminal equipment, the home location register of the calling subscriber's subscription, and the home location register of the called subscriber's subscription. In addition, the telecommunication network comprises the visited mobile switching center (VMSCA) serving the calling subscriber, the mobile switching center under which the called subscriber is located, and a communication server for performing route optimization in accordance with the invention for the telecommunication connection to be set up.

In the inventive procedure, the visited mobile switching center contacts the communication server when it detects that the calling subscriber is trying to set up a connection from his or her mobile station. The communication server then requests location information regarding the called subscriber from the home location register HLR of the called subscription; this makes it possible to identify or determine the teleoperator in whose area the called subscriber's mobile station is located. In response, the called subscriber's home location register returns the location information regarding the called subscriber to the communication server. The location of the calling subscriber's mobile station is also determined. The communication server determines the prices of a multiplicity of alternative routes for the call to be set up, using the called subscriber's Mobile Subscriber ISDN Number (MSISDN) and Mobile Subscriber Roaming Number (MSRN) and a call pricing database that is located in or at the communication server. Once the route for the telecommunication connection has been optimized, the communication server returns information corresponding to the optimal route to the visited mobile switching center, which then sets up the connection using the optimal route from the visited mobile switching center to the mobile switching center.

The procedure and system of the invention thus make it possible to set up a telecommunication connection from a calling subscriber's mobile station that is located in another teleoperator's area to a called subscriber's mobile station in a manner that minimizes the cost to the calling subscriber's service operator of the resulting telecommunication connection.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings, wherein like reference characters denote similar elements throughout the several figures.

DETAILED DESCRIPTION OF THE CURRENTLY PREFERRED EMBODIMENTS

Figure 1:
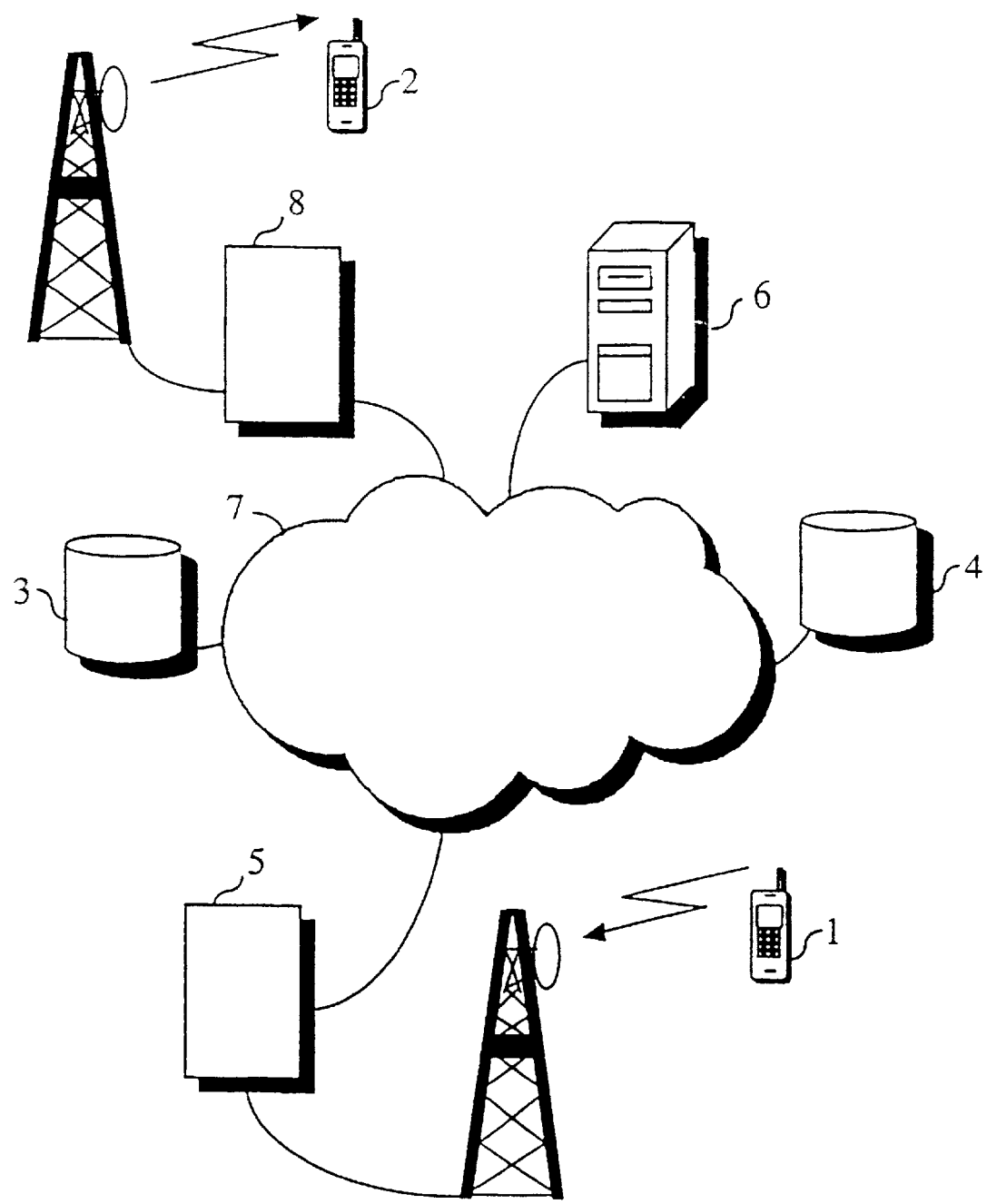
FIG. 1 diagrammatically depicts a telecommunication system in accordance with and suitable for use in the practice of the present invention.

The telecommunication system depicted in FIG. 1 comprises terminal equipment 1 of subscriber A (the calling subscriber), terminal equipment 2 of subscriber B (the called subscriber), a home location register 3 for the calling subscriber's subscription A, a home location register 4 for the called subscriber's subscription B, a visited mobile switching center 5 for or currently serving subscriber A, a communication server 6 for route optimization of the telecommunication connection to be set up between the calling and called subscribers, and a mobile switching center 8 under which the mobile station 2 of subscriber B is located, all connected to a telecommunication network 7. The terminal equipment 1 of subscriber A and terminal equipment 2 of subscriber B are, in preferred implementations of the invention, GSM mobile telephones or handsets. The communication server may for example be a so-called CAMEL Service Equipment (CSE) server; the CAMEL (Customized Applications for Mobile network Enhanced Logic) architecture is designed to provide operator-specific intelligent network services even to those subscribers who have moved outside of their own operator's mobile communication network and are under the international roaming system.

Figure 2:
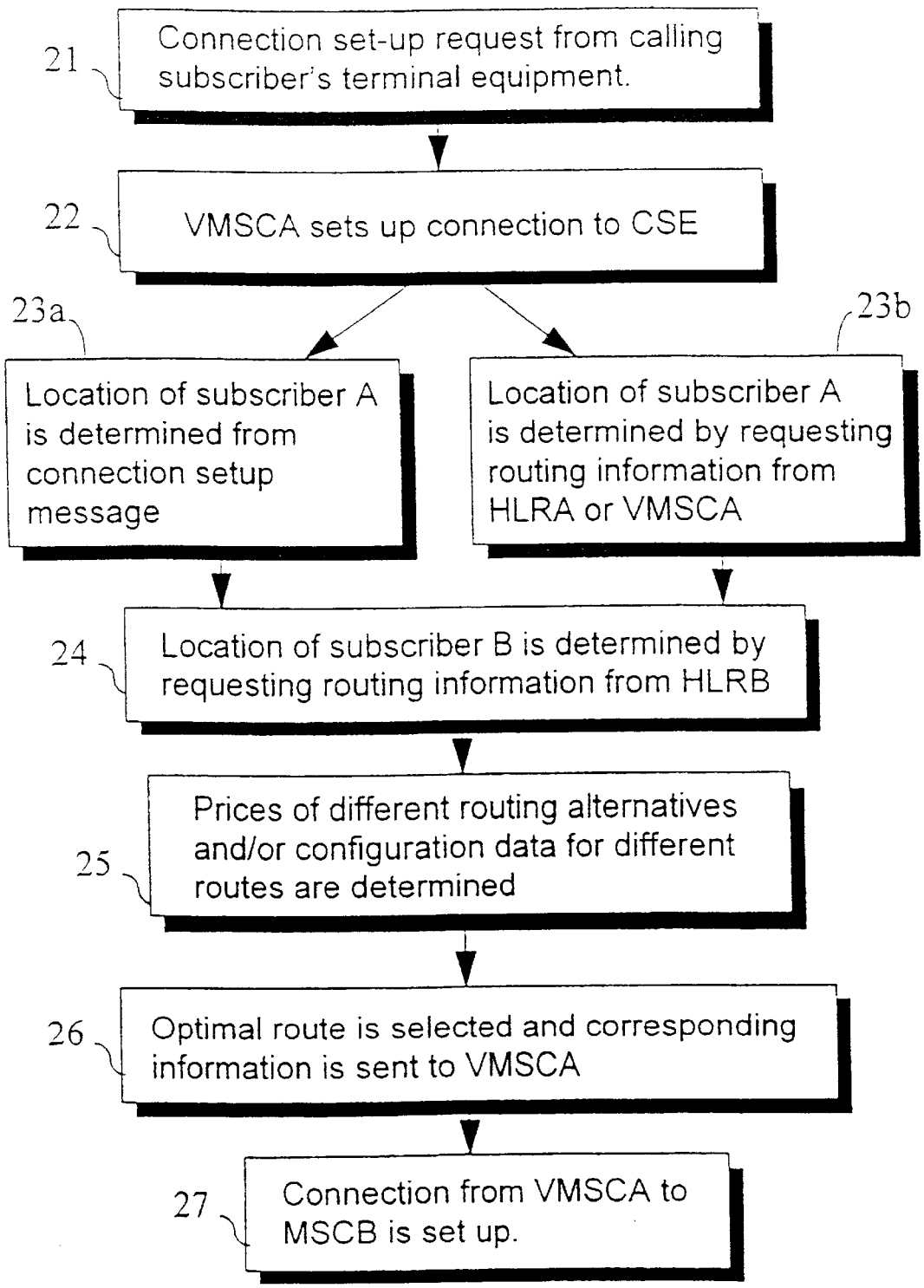
FIG. 2 is a flow chart of a procedure for setting up a telecommunication connection in accordance with the invention.

Turning now to the flow chart of FIG. 2, which illustrates an implementation of the inventive method or procedure utilizing or by reference to the system of FIG. 1, at block 21 the calling subscriber A dials the telephone number of called subscriber B via his or her terminal device 1 and presses a "ring" key to initiate the connection, whereupon the terminal device 1 transmits a connection setup request to the calling subscriber's visited mobile switching center 5. At block 22, the visited mobile switching center 5 sets up a telecommunication connection to the communication server 6. This connection generally also transmits to server 6 location information concerning the current location of the first terminal device 1 (block 23a), providing that location with sufficient accuracy for the intended application and relevant functionality. Alternatively, communication server 6 may send a request for location information regarding terminal device 1 to the calling subscriber's visited mobile switching center 5 or home location register 3; this option is shown at block 23b. At block 24, communication server 6 determines the location of the second terminal device 2 by sending a corresponding location information request Loc.inf.req. (see FIG. 3) to the home location register 4 of subscriber B. At block 25, communication server 6 determines various different possible routing alternatives based on the locations of the terminal devices 1, 2 and the call pricing data and/or network configuration data for different routes. At block 26, an optimal route is selected from among those previously determined as possible, based on the call pricing data and/or network configuration data for those routes, and corresponding information identifying or defining the selected optimal route is sent to the visited mobile switching center 5. Finally, at block 27 a telecommunication connection is set up from the visited mobile switching center 5 to the mobile switching center 8 on the basis of the received information corresponding to or denoting or defining the optimized route.

Figure 3:
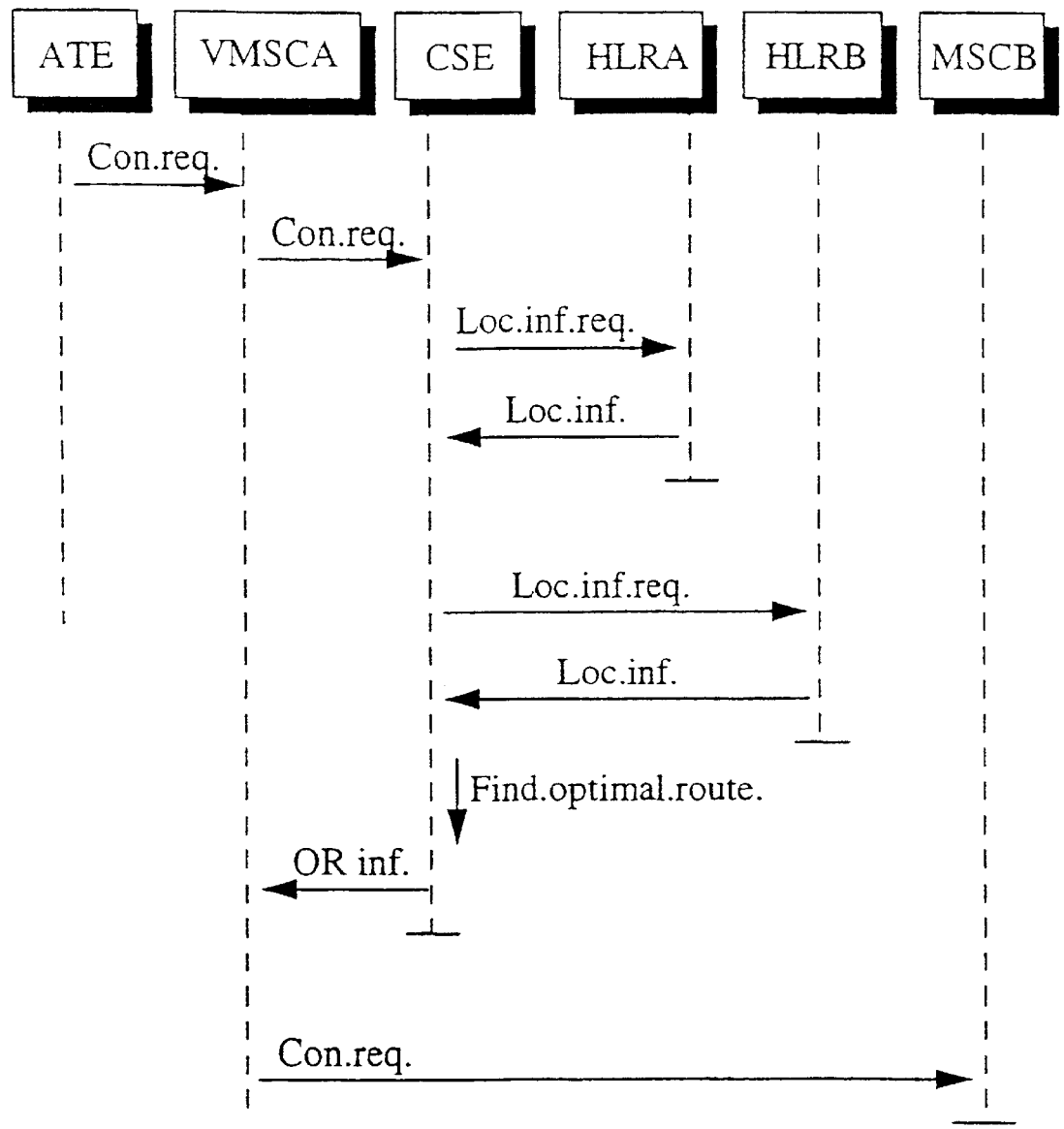
FIG. 3 depicts by way of example a signaling diagram in accordance with the inventive method for setting up a telecommunication connection on the basis of call pricing data using the system of FIG. 1.

Referring now to FIG. 3, the terminal equipment (ATE) of subscriber A sends a connection set-up request (Con.req.) to the visited mobile switching center (VMSCA), which then further sends the connection set-up request (Con.req.) to the communication server (CSE). Location information sufficiently defining the location of the terminal equipment of subscriber A is generally transmitted together with the connection set-up request. Alternatively, the communication server (CSE) may request location information (Loc.inf.req.) concerning subscriber A from subscriber A's home location register (HLRA) or directly from the visited mobile switching center (VMSCA).

Next, the communication server (CSE) determines the location of the terminal equipment of subscriber B by sending a location information request (Loc.inf.req.) to subscriber B's home location register (HLRB), which in response returns the Subscriber B location information (Loc.inf.) to the communication server (CSE). Then, based on the locations of the respective terminal equipment of subscriber A and subscriber B, the communication server (CSE) determines the various routing alternatives and the corresponding call pricing data and/or network configuration information relating to each of the alternative routes (Find.optimal.route). After selecting an optimal route, the communication server (CSE) sends the corresponding information (OR inf.) identifying the optimal route to the visited mobile switching center (VMSCA), which then sends a connection set-up request (Con.req.) to the mobile switching center (MSCB) and sets up a connection from the visited mobile switching center (VMSCA) to the mobile switching center (MSCB) on the basis of the information corresponding to or denoting the optimized route.

Figure 4:
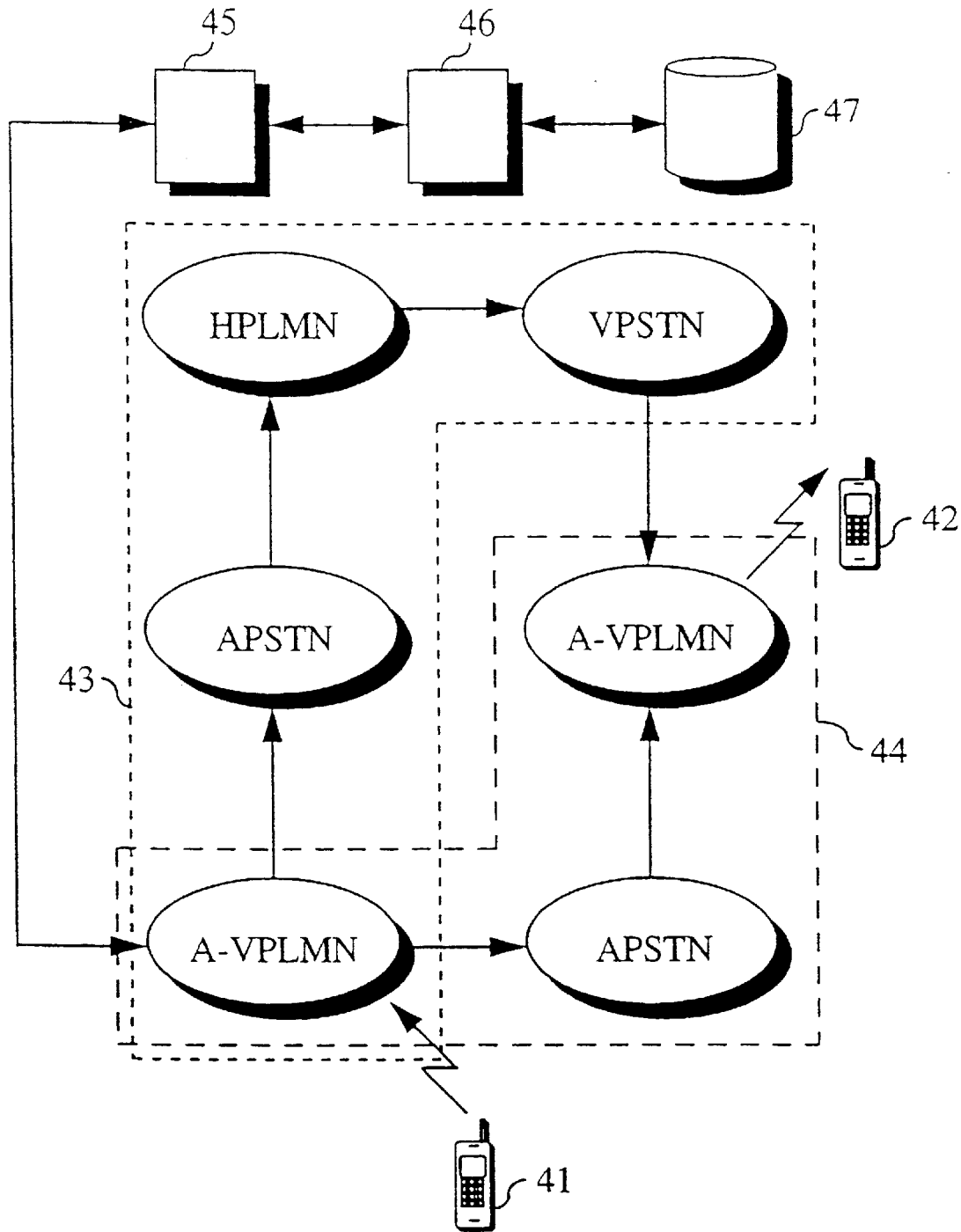
FIG. 4 depicts by way of example an arrangement and methodology in accordance with the invention for setting up a telecommunication connection on the basis of network configuration data.

FIG. 4 depicts by way of example an arrangement and methodology in accordance with the invention for setting up a telecommunication connection optimized on the basis of network configuration data. Network configuration data and call pricing data are maintained in a database. The aim is to find or identify, for a telecommunication connection, a routing alternative that will minimize the use of telephone or mobile communication networks of foreign teleoperators. For example, it may be desired that the call be routed, insofar as possible, exclusively via the telecommunication network of the calling subscriber's service operator and/or operator alliance. In the event that routing exclusively via the telecommunication networks of the service operator and/or operator alliance is not possible, then this strategy can be altered to seek to identify routes that involve, by way of illustration, switching centers of only a single foreign teleoperator.

In the particular example depicted in FIG. 4, a route is identified that takes the call exclusively via the networks of the home operator and its operator alliance. The mobile station 41 of the calling subscriber A is located in a foreign teleoperator's network and sends a connection set-up request to the mobile station 42 of the called subscriber B. The call is first connected to the foreign teleoperator's network (A-VPLMN), in which the visited mobile switching center sets up a connection via a service node 45 to a service control logic unit 46. The control logic unit 46 determines the various possible routing alternatives and the corresponding teleoperators used for each such route; this is effected using data stored in a service database 47. In routing alternative 43, the call would be routed via the operator alliance (APSTN) to the calling subscriber's home network (HPLMN). However, routing alternative 43 is rejected because the route would next take the call from the calling subscriber's home network (HPLMN) to a foreign teleoperator's network (VPSTN). Routing alternative 44, on the other hand, is accepted because it routes the call via the operator alliance (APSTN) to the area of the mobile communication network to which the mobile station of subscriber B is connected.

The present application is based at least in part on earlier, commonly-owned Finnish patent application No. FI 981776 entitled "Procedure and System for the Setting Up of a Telecommunication Connection", the entire disclosure of which is expressly incorporated by reference herein.

While there have shown and described and pointed out fundamental novel features of the invention as applied to preferred embodiments thereof, it will be understood that various omissions and substitutions and changes in the form and details of the methods and procedures described and devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/ or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A procedure for setting up a telecommunication connection between a calling subscriber and a called subscriber in a telecommunication network that includes terminal equipment of the calling subscriber, terminal equipment of the called subscriber, a home location register of the calling subscriber, a home location register of the called subscriber, a visited mobile switching center serving the calling subscriber, a communication server operative for route optimization of the telecommunication connection to be set up, and a mobile switching center, comprising the steps of:

setting up a call pricing data base containing call pricing data which accounts for costs of calls that are set up and routed in an area of a mobile switching center of another telecommunication network;

transmitting a call set-up request from the terminal equipment of the calling subscriber to the visited mobile switching center;

determining a current location in the telecommunication network of the calling subscriber terminal equipment from which the call set-up request has been transmitted;

determining in the communication server a location in the telecommunication network of the terminal equipment of the called subscriber;

determining in the communication server an optimized route for the telecommunication connection to be set up from the prices of a multiplicity of alternative routes using call pricing data in the call pricing data base and the location of the terminal equipment of the called and calling subscribers;

returning from the communication server to the visited mobile switching center information identifying the determined optimized route; and setting up the telecommunication connection from the visited mobile switching center to the mobile switching center utilizing the returned optimized route.

2. The procedure of claim 1, wherein said step of determining the location of the called subscriber terminal equipment comprises requesting location information for the called subscriber from the home location register of the called subscriber.

3. The procedure of claim 1, wherein said step of determining the current location of the calling subscriber terminal equipment comprises one of:

requesting location information relating to the calling subscriber from the home location register of the calling subscriber; and sending location information relating to the calling subscriber from the visited mobile switching center to the communication server.

4. The procedure of claim 1, wherein said step of determining an optimized route comprises:

identifying, in the communication server using one of an MSISDN number and a tracing number of the called subscriber, a plurality of routing alternatives for the telecommunication connection to be set up;

determining, at the communication server, call pricing data for each of the plural identified routing alternatives; and identifying from among the plural identified routing alternatives, based on the determined call pricing data, an optimal route for the telecommunication connection to be set up to define the optimized route.

5. The procedure of claim 1, further comprising the step of updating a database in the communication server storing the one of the call pricing data and network configuration data to maintain current data in the database.

* * * * *

UNITED STATES PATENT AND TRADEMARK OFFICE
CERTIFICATE OF CORRECTION

PATENT NO. : 6,850,762 B1
DATED : February 1, 2005
INVENTOR(S) : Sami Ala-Luukko It is certified that error appears in the above-identified patent and that said Letters Patent is hereby corrected as shown below:

Title page,
Item [63], Related U.S. Application Data, should read
-- This is a continuation of PCT Application No. PCT/FI98/00999, filed on December 18, 1998, which claims priority from Finland Application No. FI 974651, filed December 31, 1997. --

Signed and Sealed this

Twenty-first Day of June, 2005

JON W. DUDAS
*Director of the United States Patent and Trademark Office*